:::

United States Patent
Sato

(10) Patent No.: US 8,957,864 B2
(45) Date of Patent: Feb. 17, 2015

(54) COORDINATE INPUT APPARATUS AND METHOD

(75) Inventor: Hajime Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 12/190,163

(22) Filed: Aug. 12, 2008

(65) Prior Publication Data

US 2009/0044989 A1   Feb. 19, 2009

(30) Foreign Application Priority Data

Aug. 13, 2007   (JP) .................................. 2007-211057

(51) Int. Cl.
G06F 3/041 (2006.01)
G06F 3/042 (2006.01)
G02B 5/124 (2006.01)

(52) U.S. Cl.
CPC ............ *G06F 3/0416* (2013.01); *G06F 3/0421* (2013.01); *G02B 5/124* (2013.01)
USPC ........................................ 345/173; 178/18.01

(58) Field of Classification Search
CPC ........... G06F 3/00; G06F 3/01; G06F 3/0421; G06F 3/0416
See application file for complete search history.

(56) References Cited

U.S. PATENT DOCUMENTS

| 4,507,557 | A | 3/1985 | Tsikos |
| 6,429,856 | B1 | 8/2002 | Omura et al. |
| 6,480,187 | B1 | 11/2002 | Sano et al. |
| 6,570,103 | B1 | 5/2003 | Saka et al. |
| 6,943,779 | B2 * | 9/2005 | Satoh .............................. 345/173 |
| 7,015,894 | B2 * | 3/2006 | Morohoshi ..................... 345/156 |
| 7,113,174 | B1 * | 9/2006 | Takekawa et al. ............. 345/173 |
| 7,589,715 | B2 * | 9/2009 | Tanaka et al. .................. 345/175 |
| 2005/0041013 | A1 * | 2/2005 | Tanaka ........................... 345/156 |
| 2006/0012579 | A1 | 1/2006 | Sato |
| 2007/0262965 | A1 * | 11/2007 | Hirai et al. ..................... 345/173 |
| 2008/0092245 | A1 * | 4/2008 | Alward et al. ................... 726/28 |

FOREIGN PATENT DOCUMENTS

| JP | 2896183 B2 | 10/1991 |
| JP | 2002-055770 | 2/2002 |
| JP | 2003-303046 | 10/2003 |
| JP | WO2006027924 | * 3/2006 .............. G06F 3/033 |
| WO | 2005031554 | 4/2005 |

* cited by examiner

*Primary Examiner* — William Boddie
*Assistant Examiner* — Alecia D English
(74) *Attorney, Agent, or Firm* — Canon USA, Inc., IP Division

(57) ABSTRACT

A coordinate input apparatus inputs detection signals output from a plurality of detection units configured to detect an input coordinate position on a coordinate input region. In a case where a plurality of signal change ranges occur in each of detection signals output from the plurality of detection units, the coordinate input apparatus selects one of a plurality of coordinate positions corresponding to the plurality of signal change ranges according to which hand an operator uses to input a coordinate position.

10 Claims, 10 Drawing Sheets

COORDINATE INPUT APPARATUS AND METHOD

BACKGROUND OF THE INVENTION

1. Field of the Invention

The present invention relates to a coordinate input apparatus and method.

2. Description of the Related Art

There exist coordinate input apparatuses configured to allow a user to input coordinates by pointing to a coordinate position on a coordinate input surface with a pointing tool or device (e.g., a dedicated input pen or a finger) so as to control a connected computer or to write characters or graphics.

Hitherto, such coordinate input apparatuses have been proposed or commercialized as touchscreens of various types.

There are various coordinate input methods using, for example, a resistive film or ultrasonic waves. For example, U.S. Pat. No. 4,507,557 discusses a coordinate input method using light.

U.S. Pat. No. 4,507,557 discusses the following configuration. A retroreflective sheet is provided outside a coordinate input region. Sets of an illuminating unit configured to illuminate the coordinate input region with light and a light receiving unit configured to receive light are provided at corner end portions of the coordinate input region. Then, an angle between a light-blocking object, such as a finger, and each of two light receiving units is detected. Thus, the position pointed to by the light-blocking object is determined based on results of the detection.

U.S. Pat. Nos. 6,429,856 and 6,570,103 discuss coordinate input apparatuses configured to have a retroreflective member provided around the periphery of a coordinate input region and to detect coordinates of a portion that blocks retroreflected light (light-blocking portion).

In a coordinate input apparatus discussed in U.S. Pat. No. 6,429,856, waveform data represents the distribution of intensity of light output from a light receiving unit that receives retroreflected light. A peak in the waveform data, which corresponds to a light-blocking portion generated by a light-blocking object, is detected by performing a waveform processing operation, such as a differential operation, on the waveform data. Then, coordinates of the position of the light-blocking object are calculated from a result of the detection. Further, in a coordinate input apparatus discussed in U.S. Pat. No. 6,570,103, one end and the other end of a light-blocking object are detected by comparison between image data and a specific threshold level pattern. Then, the center of the coordinate positions of the one end and the other end of the light-blocking object is detected.

Hereinafter, a system for calculating coordinates by detecting a light-blocking position, as discussed in U.S. Pat. Nos. 4,507,557, 6,429,856, and 6,570,103, is referred to as a light-blocking system.

The above-described coordinate input apparatuses may cause the following problem. In a case where a position on a coordinate input surface is pointed to, a part of the operator's body other than a pointing tool, such as a finger or a pen, may touch the coordinate input surface. Thus, coordinates may be detected at a position different from a correct position to which the operator intends to point. Consequently, a malfunction may occur.

U.S. Pat. No. 6,480,187 discusses a technique for disabling, in a case where an operator's palm or elbow touches a coordinate input surface, a detected position, as a countermeasure against the above-described problem. More specifically, a range blocked by a pointing tool is measured. Then, the size of the pointing tool is calculated. Thus, the kind of the pointing tool is determined. In the case of coordinates of a position pointed to by an object that is not a predetermined pointing tool, those coordinates are not output.

International Publication No. WO/2005/031554 discusses an apparatus configured to calculate a coordinate position using two imaging units for capturing an image of a pointed shadow. In this apparatus, each of the imaging units includes an image sensor, a lens, and a light source. The light source is provided in the vicinity of one of the left and right sides, which is an upper side in the horizontal direction of the image sensor. The coordinate position of a pointing tool is calculated utilizing the coordinates of an upper end portion of an image of the shadow. With this configuration, only an end portion of a pointing tool, which is at the side closer to a detection unit provided at an upper part of a detection surface, is detected. Thus, the detection of a pointed coordinate position is not affected by an operator's palm, etc., which is located lower than the end portion of the pointing tool.

In addition, a coordinate input apparatus of the light-blocking system type capable of detecting a plurality of coordinate positions has been devised to allow a plurality of operators to simultaneously input coordinates.

Japanese Patent Application Laid-Open Nos. 2002-055770 and 2003-303046 and Japanese Patent Registration No. 2896183 discuss apparatuses configured to detect angles of a plurality of light-blocking portions using a single light receiving sensor, to calculate several input coordinate candidates from a combination of angles of sensors, and to determine coordinates actually input from the input coordinate candidates.

For example, in a case where two-point input is executed, coordinate positions of up to four points are calculated as input coordinate candidates. Among the four points, two points actually input by an operator are determined and output. That is, in this determination, actual input coordinates (corresponding to real images) and false input coordinates (corresponding to virtual images) are discriminated among a plurality of input coordinate candidates. Thus, final input coordinates are determined. Hereinafter, this determination is referred to as "real/virtual determination".

Japanese Patent Application Laid-Open Nos. 2002-055770 and 2003-303046 discuss the following method as a more specific method for "real/virtual determination". That is, first and second sensors are provided at both ends of one side of a conventional coordinate input region, respectively, by being spaced from each other a distance sufficient to calculate coordinates of a position pointed on the coordinate input region with good precision. In addition, a third sensor is provided at a position between the first sensor and the second sensor by being spaced therefrom a sufficient distance. Then, the "real/virtual determination" is performed on angle information representing a plurality of angles of a light-blocking portion detected by the first sensor and the second sensor based on angle information obtained by the third sensor, which differs from the angle information detected by the first sensor and the second sensor.

However, the conventional light-blocking system cannot always determine an operator's unintentional input due to the operator's palm or elbow or a sleeve of the operator's clothes as a false detection.

In a stationary state, it is often that the shadows of, for example, an operator's palm or elbow or a sleeve of the operator's clothes are larger than the shadow of a pointing tool (assumed to be a finger or a pointing pen). However, in a transient state in which the shadows of an operator's palm or elbow or a sleeve of the operator's clothes enter or exit the light-blocking region, sometimes, the shadow thereof formed by blocking light can be small and cannot always be larger than that of the pointing tool. That is, in a case where the width of a shadow to be determined as an erroneous input object is substantially equal to or smaller than that of the pointing tool, such a shadow cannot be determined as an erroneous input object. The technique discussed in U.S. Pat. No. 6,480,187 does not solve this problem.

Among a plurality of coordinate candidates, a true input coordinate position is not always located above an erroneous input coordinate position. This phenomenon is described below with reference to FIGS. 12A and 12B.

FIG. 12A illustrates a case where a true input coordinate position 1284 and an erroneous input coordinate position 1282 are vertically arranged on a coordinate input region 2800. Neither a position 1281 nor a position 1283 is actually pointed to. However, the coordinates of the positions 1281 and 1283 are those of virtual images, which are calculated as coordinate candidates. In this case, the true input coordinate position 1284 is located above the erroneous input coordinate position 1282. Thus, even a conventional apparatus can determine the erroneous input coordinate position 1282 as an erroneous input.

FIG. 12B illustrates a case where a true input coordinate position 1285 and an erroneous input coordinate position 1287 are horizontally arranged on the coordinate input region 2800. Neither a position 1286 nor a position 1288 is actually pointed to. However, the coordinates of the positions 1286 and 1288 are those of virtual images, which are calculated as coordinate candidates. In this case, the true input coordinate 1285 is located lower than the erroneous input coordinate position 1287. Thus, a conventional apparatus cannot determine the erroneous input coordinate position 1287 as an erroneous input.

Thus, in a case where among the four coordinate candidates, a pair of coordinate positions including a true input coordinate position is arranged in a substantially horizontal direction, a coordinate position to be detected as an erroneous input coordinate position can be located upper than the true input coordinate position. The apparatus discussed in International Publication No. WO/2005/031554 selects an upper coordinate position as a true input coordinate position. Thus, the apparatus discussed in International Publication No. WO/2005/031554 does not solve this problem.

On the other hand, it is considered that a plurality of coordinate positions including that of a pointing tool and those of erroneous input objects due to an operator's palm or elbow or a sleeve of the operator's clothes are calculated using apparatuses discussed in Japanese Patent Application Laid-Open Nos. 2002-055770 and 2003-303046 and Japanese Patent Registration No. 2896183, which can detect a plurality of coordinate positions, and that an upper coordinate position is selected from among a plurality of coordinate candidates as that of the pointing tool.

However, even in this case, although the "real/virtual determination" for selecting a pair of real images due to a true input and an erroneous input from among a plurality of coordinate candidates can be performed as described above, it is difficult to determine which of the real images of the selected pair is the coordinate position due to a true input.

SUMMARY OF THE INVENTION

The present invention is directed to preventing adverse effects from being caused by an operator's unintentional erroneous input.

According to an aspect of the present invention, a coordinate input apparatus includes a plurality of detection units configured to detect an input coordinate position on a coordinate input region, and a selection unit configured to select, in a case where a plurality of signal change ranges occur in each of detection signals output from the plurality of detection units, one of a plurality of coordinate positions corresponding to the plurality of signal change ranges according to which hand an operator uses to input a coordinate position.

According to another aspect of the present invention, a coordinate input apparatus includes a plurality of detection units configured to detect an input coordinate position on a coordinate input region, a dividing unit configured to divide, in a case where two signal change ranges occur in each of detection signals output from the plurality of detection units, a plurality of coordinate positions corresponding to the two signal change ranges into a plurality of pairs each of which includes two coordinate positions, a pair selection unit configured to select one of the plurality of pairs based on a distance between two coordinate positions of each of the plurality of pairs, and a coordinate selection unit configured to select an upper one of two coordinate positions of the selected pair.

According to still another aspect of the present invention, a coordinate input apparatus includes a plurality of detection units configured to detect an input coordinate position on a coordinate input region, and a selection unit configured to select, in a case where a plurality of signal change ranges occur in each of detection signals output from the plurality of detection units, one of a plurality of coordinate positions corresponding to the plurality of signal change ranges according to a location of an operator.

According to yet another aspect of the present invention, a method for inputting coordinates includes inputting detection signals output from a plurality of detection units configured to detect an input coordinate position on a coordinate input region, and selecting, in a case where a plurality of signal change ranges occur in each of detection signals output from the plurality of detection units, one of a plurality of coordinate positions corresponding to the plurality of signal change ranges according to which hand an operator uses to input a coordinate position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
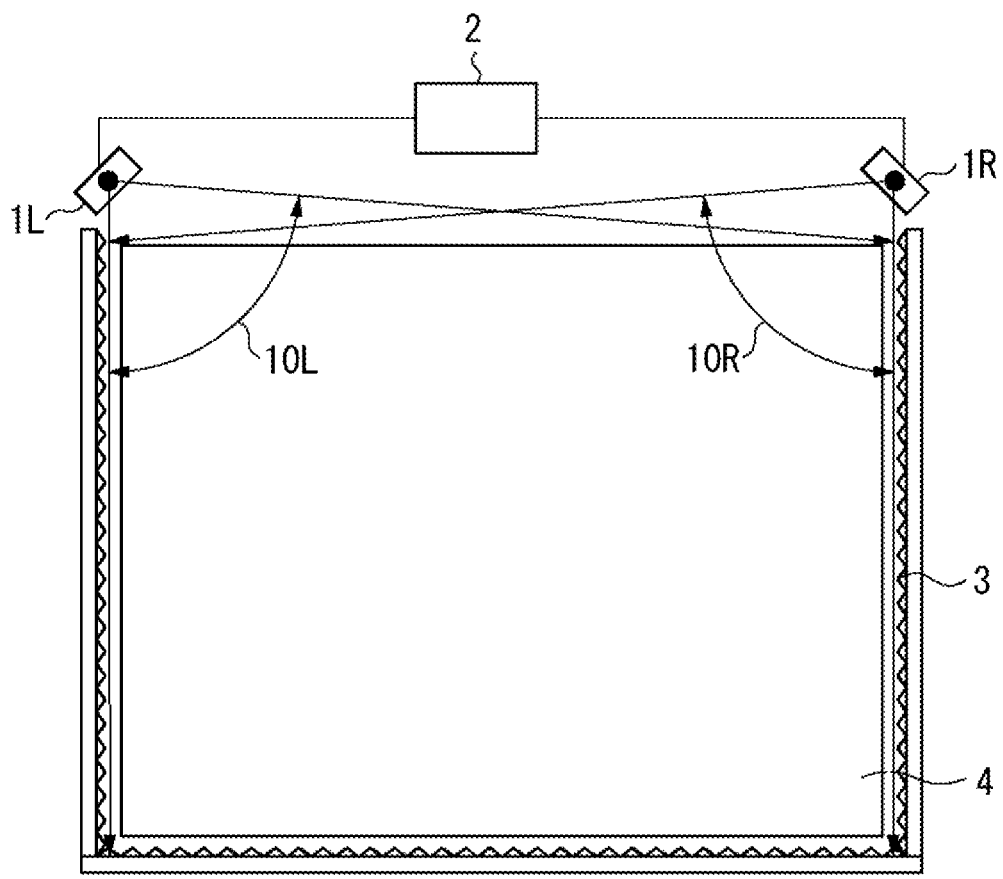
FIG. 1 illustrates an example configuration of a coordinate input apparatus according to a first exemplary embodiment of the present invention.

FIG. 1 illustrates an exemplary configuration of a coordinate input apparatus according to a first exemplary embodiment of the present invention.

Figure 5:
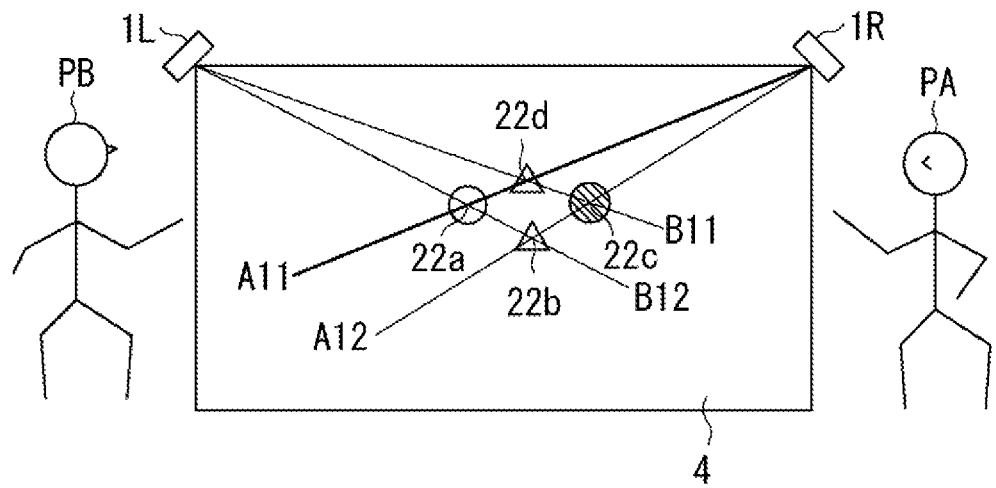
FIG. 5 illustrates a relationship between the location of an operator and a pointing operation with respect to an image display surface.

Each of sensor units (sensors) 1L and 1R illustrated in FIG. 1 has a light projecting unit (phototransmitter) and a detection unit (photoreceptor) (see FIG. 5 of U.S. Patent Application publication No. US 2006/0012579 A1). The sensor units 1L and 1R are installed a predetermined distance from each other. Each of light projecting ranges (light projecting angles) 10L and 10R of the sensor units 1L and 1R is approximately 90 degrees. The sensor units 1L and 1R are connected to a control/arithmetic unit 2, which executes various control and arithmetic processes. The sensor units 1L and 1R operate according to control signals sent from the control/arithmetic unit 2. In addition, the sensor units 1L and 1R output signals representing detected light amount distributions of reflected light to the control/arithmetic unit 2.

A retroreflective member 3 is configured to reflect light projected from the sensor units 1L and 1R. The retroreflective member 3 has a retroreflective surface that reflects incident light, which is projected from the sensor units 1L and 1R, in a direction that is parallel to the angle of incidence. More specifically, light rays projected from the sensor units 1L and 1R to a light projecting range of an angle of substantially 90 degrees are retroreflected towards the sensor units 1L and 1R, respectively. As illustrated in FIG. 1, the retroreflective member 3 is mounted on peripheral portions of a coordinate input region 4.

Light rays retroreflected towards the sensor units 1L and 1R are one-dimensionally detected by each detection device which is constituted by a light condensing optical system and a line charge-coupled device (CCD) of each of the sensor units 1L and 1R. Then, data representing a light amount distribution of the retroreflected light is sent to the control/arithmetic unit 2.

The coordinate input region 4 is constituted by the screen of a display device, such as a plasma display panel (PDP), a rear projector, or a liquid crystal display (LCD) panel, and can be utilized as an interactive input device.

With such a configuration, when input pointing is performed on the coordinate input region 4 by a pointing tool, such as an operator's finger or an input pen, light projected from the light projecting units of the sensor units 1L and 1R is blocked. Thus, this light is not retroreflected by the retroreflective member 3. Consequently, a light amount of reflected light corresponding to a position, at which the input pointing is performed, is not obtained.

The control/arithmetic unit 2 detects a light-blocking range of a portion, at which input pointing is performed by a pointing tool, according to a change in the light amount, which is detected by the sensor units 1L and 1R. Then, the control/arithmetic unit 2 identifies a detection point in the light-blocking range, and calculates an angle between the pointing tool and each of the sensor units 1L and 1R. Thus, the control/arithmetic unit 2 calculates the position pointed to by the pointing tool on the coordinate input region 4 based on the calculated angles and the distance between the sensor units 1L and 1R. Then, the control/arithmetic unit 2 outputs data representing the pointed position to an external terminal, such as a computer connected to the coordinate input apparatus, via an interface, such as a universal serial bus (USB).

Thus, operations to be performed on a computer, for example, operations of drawing lines on a screen of a display unit using an operator's finger, and of operating an icon displayed on the screen thereof are enabled.

Figure 3:
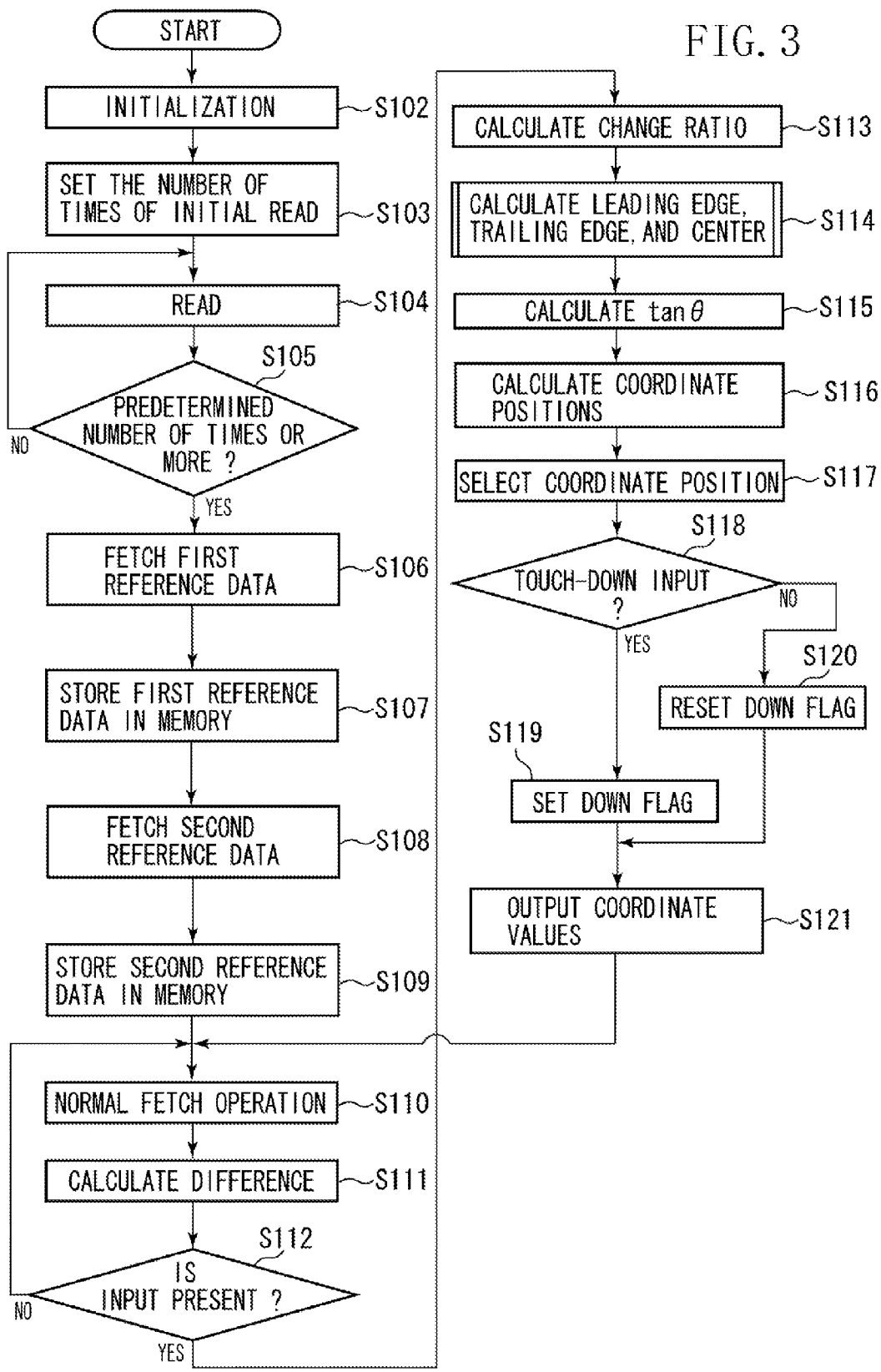
FIG. 3 illustrates a flow chart of a coordinate input process for obtaining the coordinate position of a pointing tool, which is executed by the coordinate input apparatus according to the first exemplary embodiment of the present invention.
Figure 4:
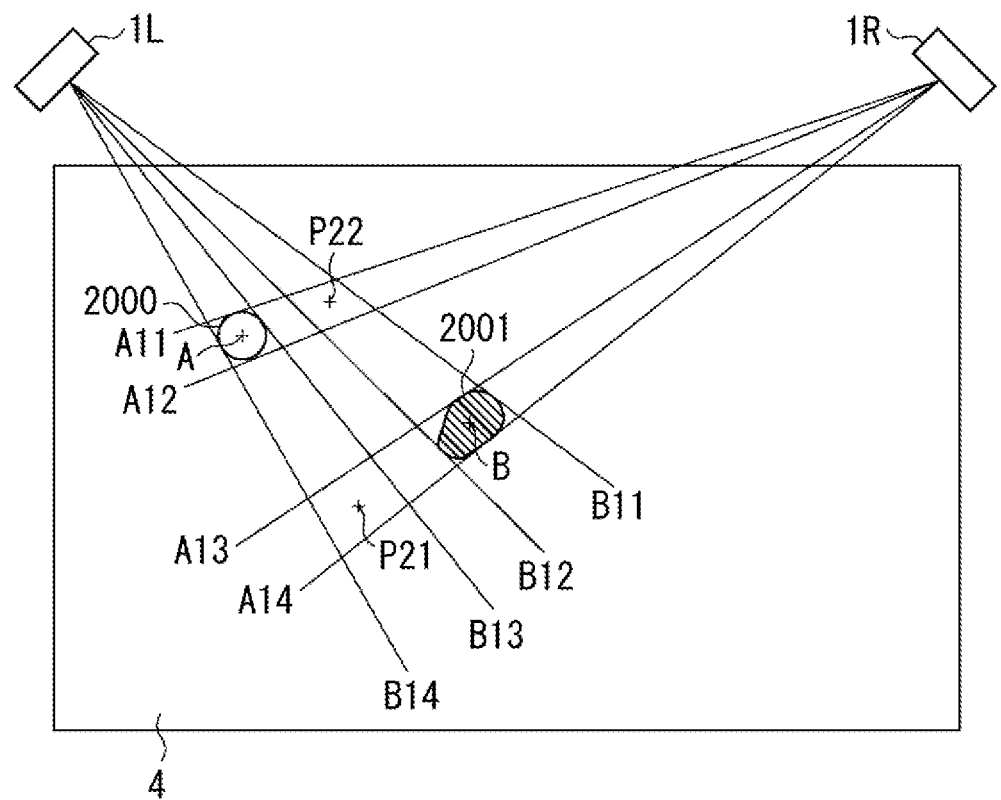
FIG. 4 illustrates an example of a coordinate input region in a case where each of two sensor units detects a plurality of light-blocking ranges.

Devices illustrated in FIGS. 3, 4, and 5 of U.S. Patent Application Publication No. US 2006/0012579 A1 can be used as the sensor units 1L and 1R and the light projecting units and the detection units of the sensor units 1L and 1R.

Figure 6:
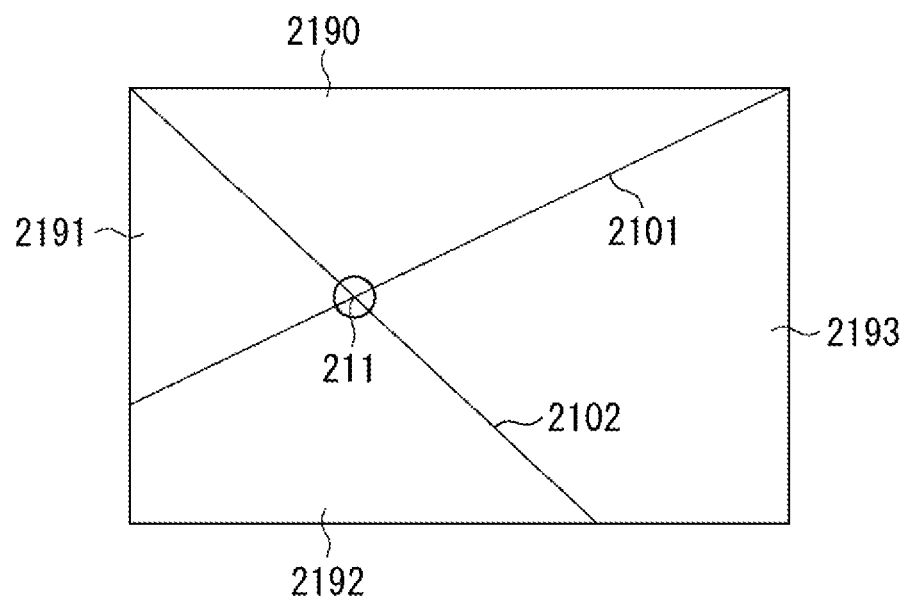
FIG. 6 illustrates surrounding regions of a true input coordinate position.

The retroreflective member 3 has a reflection characteristic with respect to an incidence angle. According to the reflection characteristic, for example, in a case where the retroreflective member 3 is formed flat like a tape, the light amount of reflected light obtained in a range in which an incidence angle of incident light upon the retroreflective member 3 exceeds 45 degrees decreases, as illustrated in FIG. 6 of U.S. Patent Application Publication No. US 2006/0012579 A1.

Figure 7:
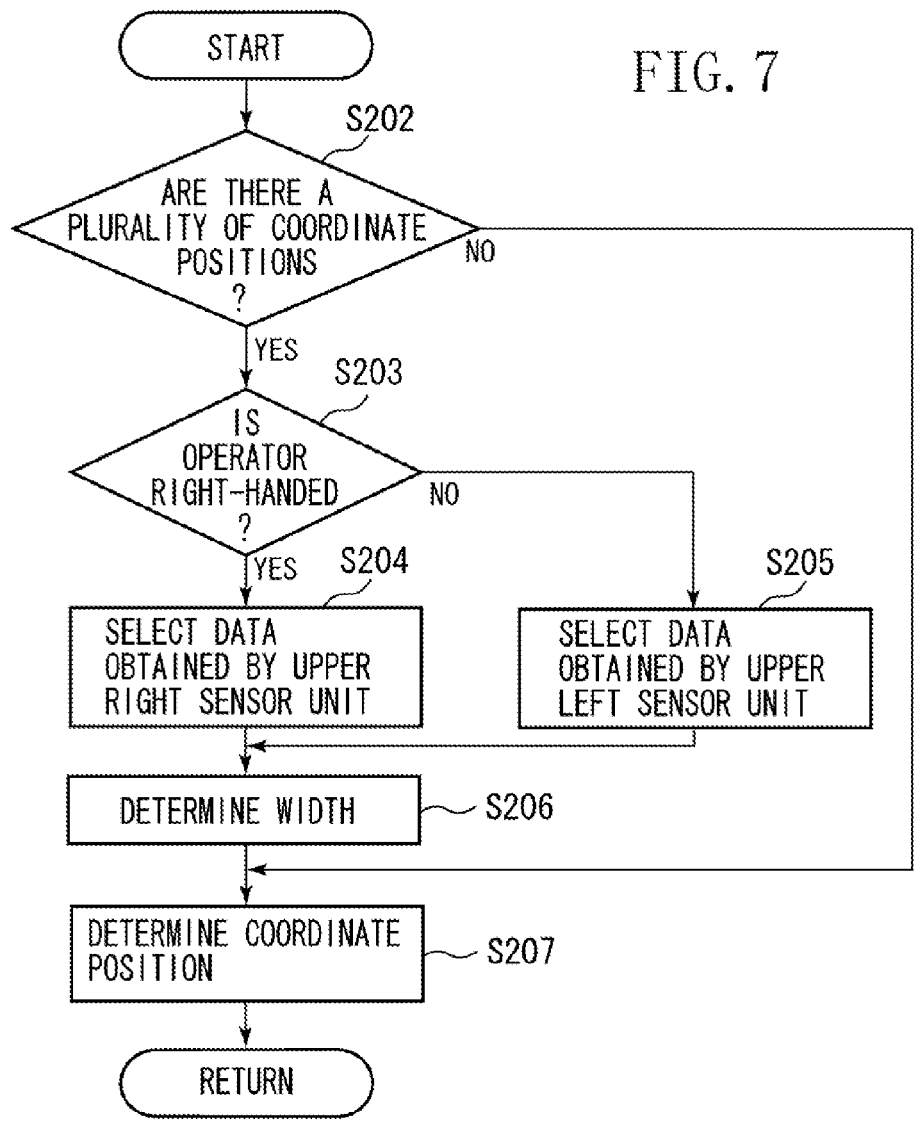
FIG. 7 illustrates a flow chart of a true input coordinate position selection process executed in step S117 illustrated in FIG. 3.

Thus, the retroreflective member is constructed with a plurality of triangular prisms illustrated in FIG. 7 of U.S. Patent Application Publication No. US 2006/0012579 A1 in order to uniformize the light amount of light obtained by reflecting incident light upon the retroreflective member 3. Consequently, the reflection characteristic with respect to the incidence angle can be improved.

Each of the sensor units 1L and 1R receives CCD control signals for the line CCD provided in an associated one of the sensor units 1L and 1R, and CCD clock signals from the control/arithmetic unit 2. In addition, each of the sensor units 1L and 1R receives drive signals for an infrared light emitting diode (LED) of the light projecting unit of each of the sensor units 1L and 1R from the control/arithmetic unit 2.

Figure 2:
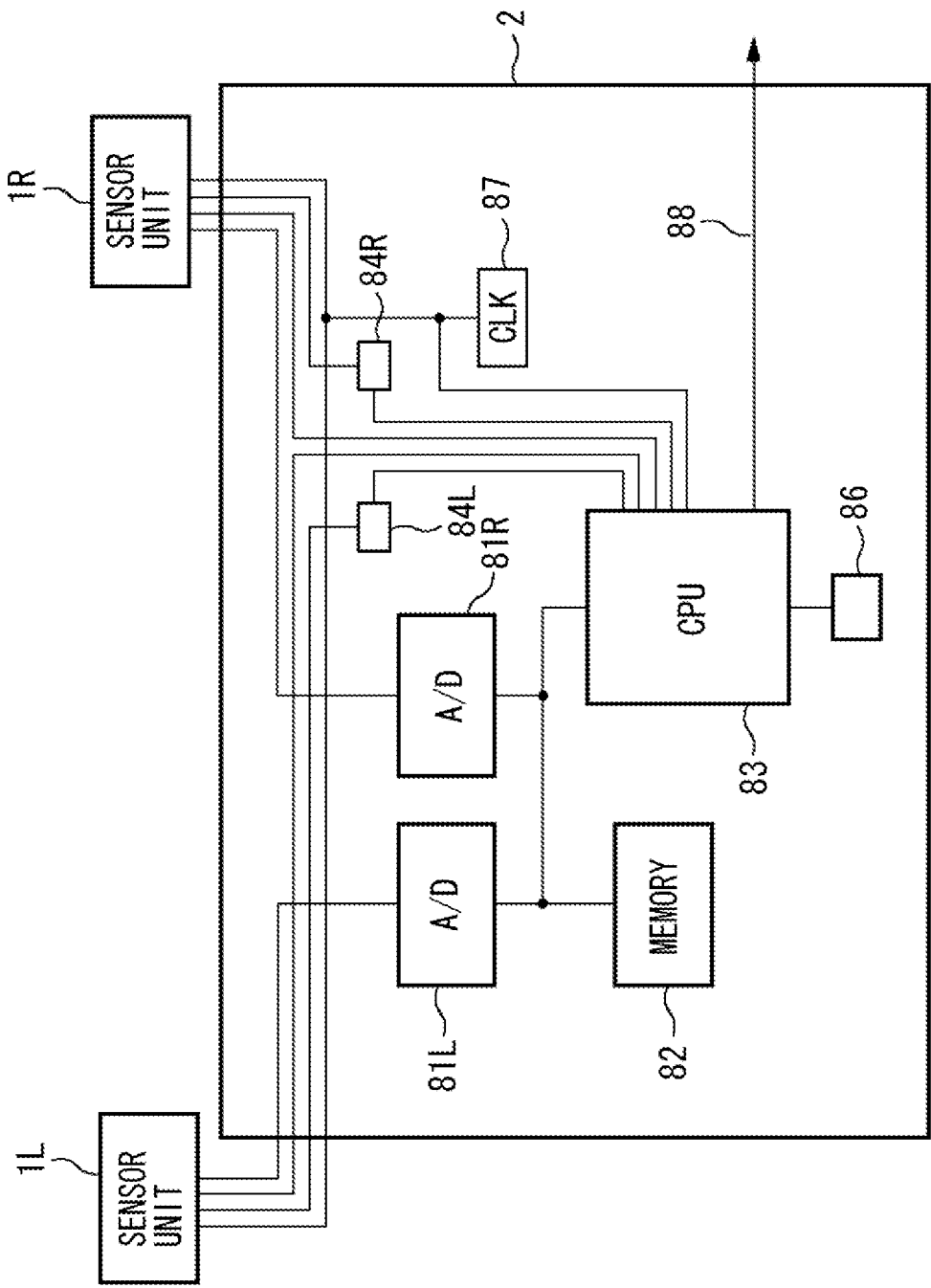
FIG. 2 illustrates a block diagram of an example of a hardware configuration of a control/arithmetic unit according to the first exemplary embodiment of the present invention.

An example configuration of the control/arithmetic unit 2 is described below in detail with reference to FIG. 2. FIG. 2 is a block diagram illustrating an example of the hardware configuration of the control/arithmetic unit 2.

CCD control signals are output from an arithmetic control circuit (central processing unit (CPU)) 83 constituted by a one-chip microcomputer. According to the CCD control signals, shutter timing of the line CCDs of the sensor units 1L and 1R and data output are controlled. CCD clock signals are sent from a clock generating circuit (CLK) 87 to the sensor units 1L and 1R. In addition, the CCD clock signals are also input to the arithmetic control circuit 83 to perform various control operations in synchronization with the line CCDs provided in the sensor units 1L and 1R.

Each of LED drive signal for driving the infrared LEDs of the light projecting units of the sensor units 1L and 1R are supplied from the arithmetic control circuit 83 to an associated one of the infrared LEDs of the light projecting units of the sensor units 1L and 1R via an associated one of LED drive circuits 84L and 84R.

Detection signals output from the line CCDs of the detection units of the sensor units 1L and 1R are input to respective A/D converters 81L and 81R of the control/arithmetic unit 2. Then, the detection signals are converted into digital values under the control of the arithmetic control circuit 83. The converted digital values are stored in a memory 82 and are used to calculate an angle of the pointing tool. Then, coordinate values are computed from the calculated angle. The computed coordinate values are output to an external terminal via a serial interface 88 (e.g., USB, RS-232C interface, etc.).

Figure 9:
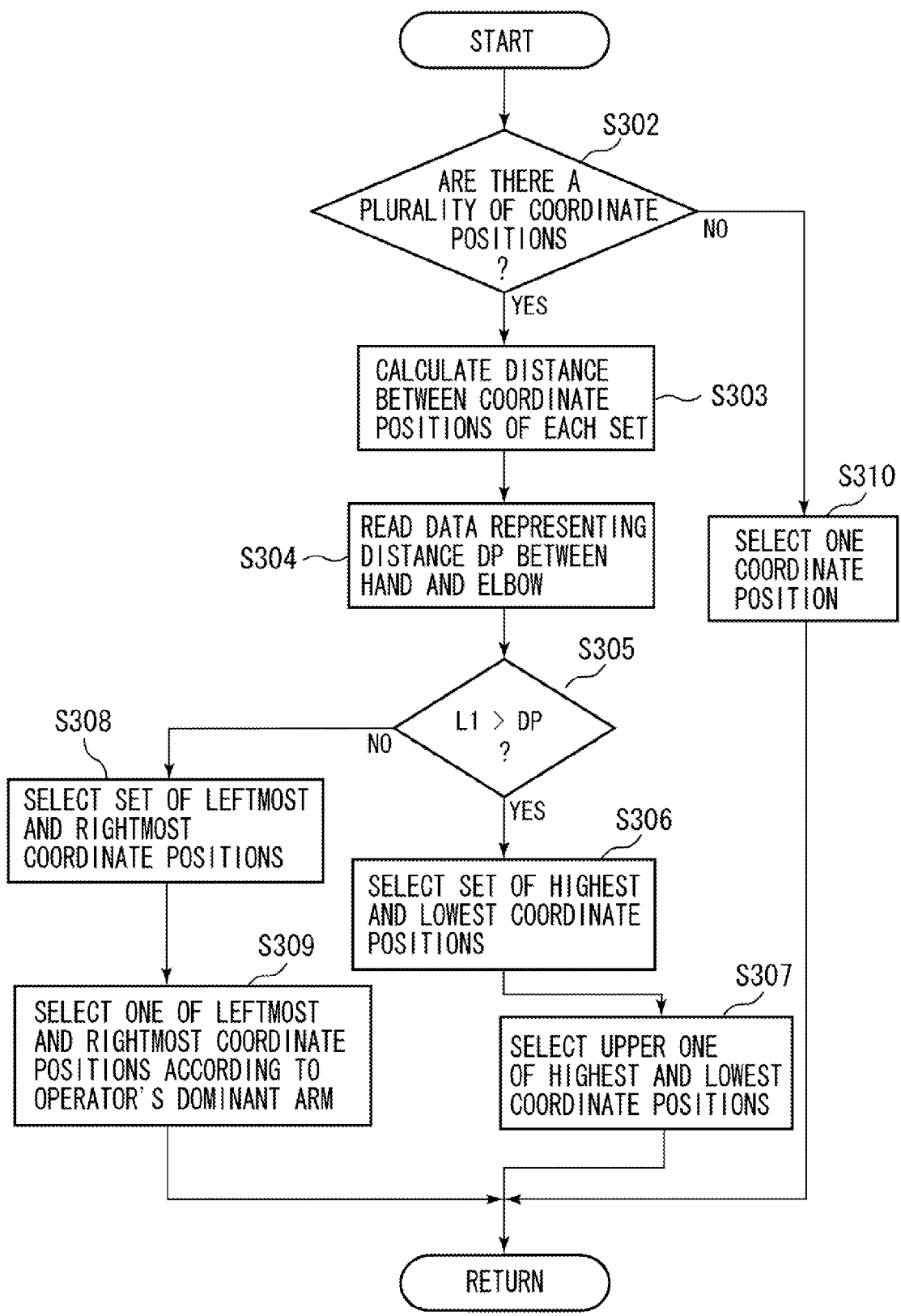
FIG. 9 illustrates a flow chart of the process executed in step S117 illustrated in FIG. 3 according to a second exemplary embodiment of the present invention.

A timing chart of a control signal according to the present embodiment can be set similar to that illustrated in FIG. 9 of U.S. Patent Application Publication No. US 2006/0012579 A1.

Figure 10:
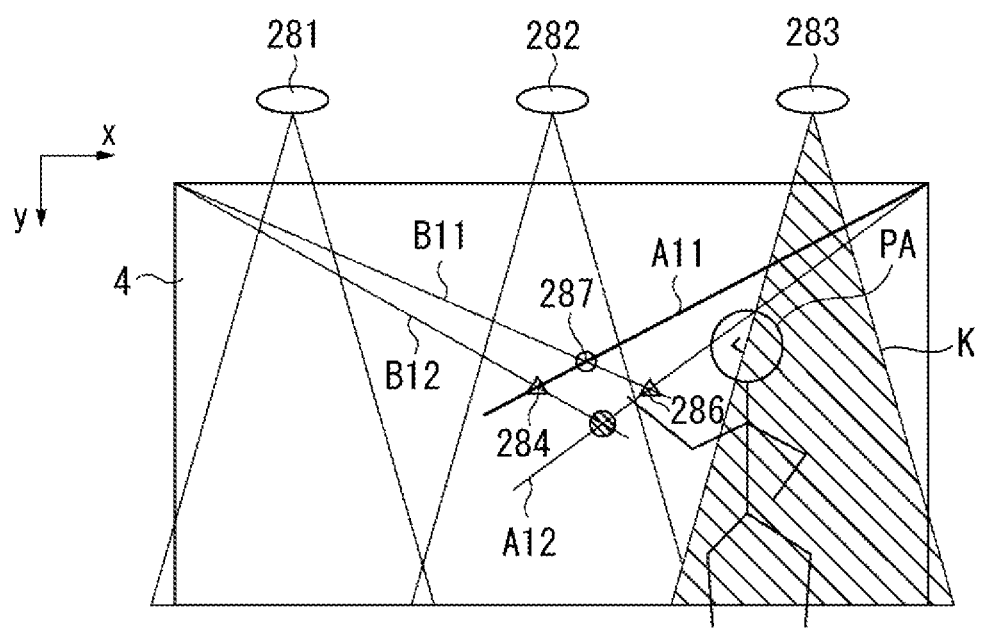
FIG. 10 illustrates a positional relationship between a coordinate input region and an operator.

In a case where there is no input pointing performed on the coordinate input region 4, the detection signals read out of both of the sensor units 1L and 1R are output signals therefrom, which represent light amount distributions similar to that illustrated in FIG. 10 of U.S. Patent Application Publication No. US 2006/0012579 A1.

Figure 11:
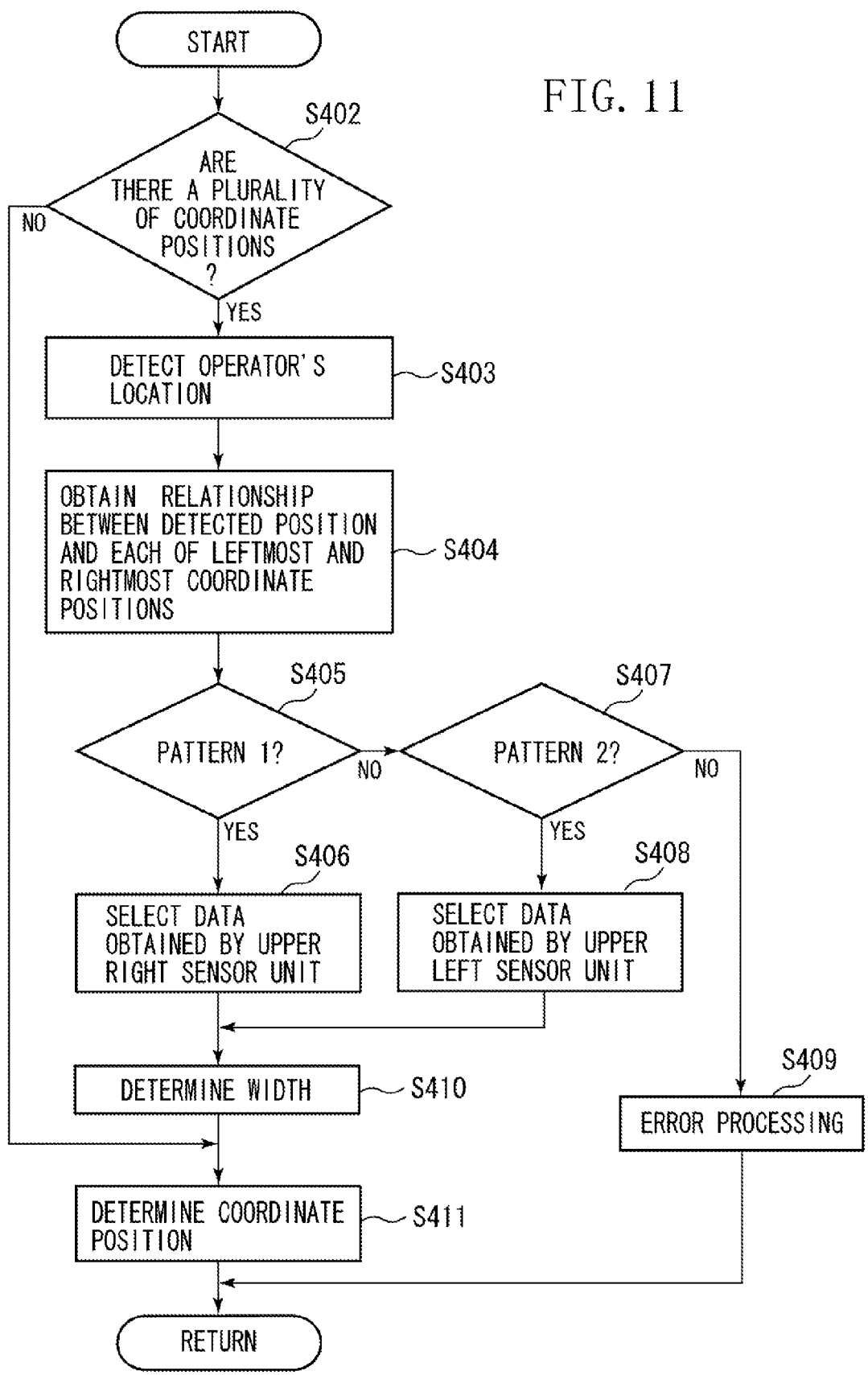
FIG. 11 illustrates a flow chart of the process executed in step S117 illustrated in FIG. 3 according to a third exemplary embodiment of the present invention.
Figure 12A:
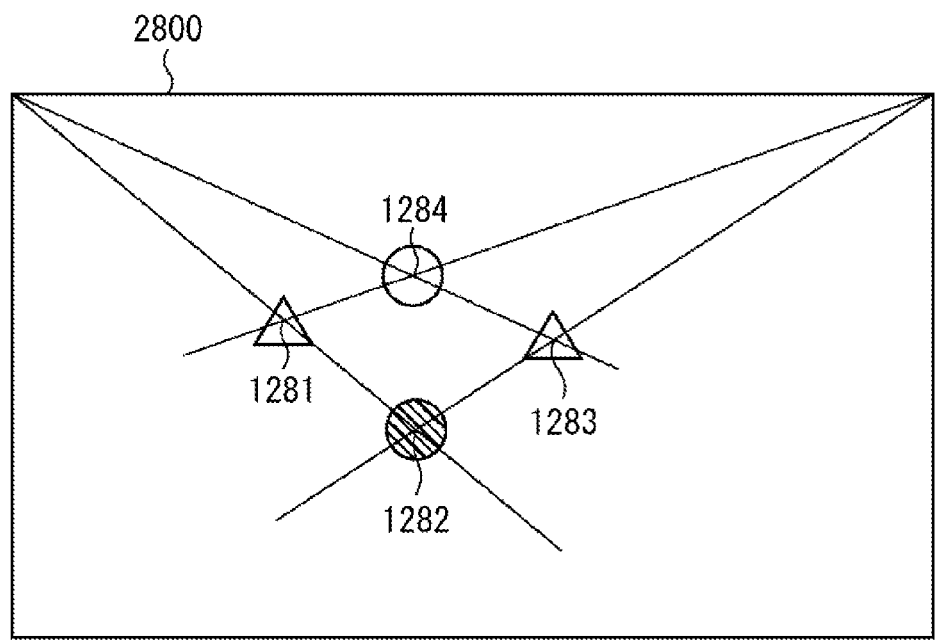
FIG. 12A illustrates a case where a true input coordinate position and an erroneous input coordinate position are arranged in a vertical direction on a coordinate input region.
Figure 12B:
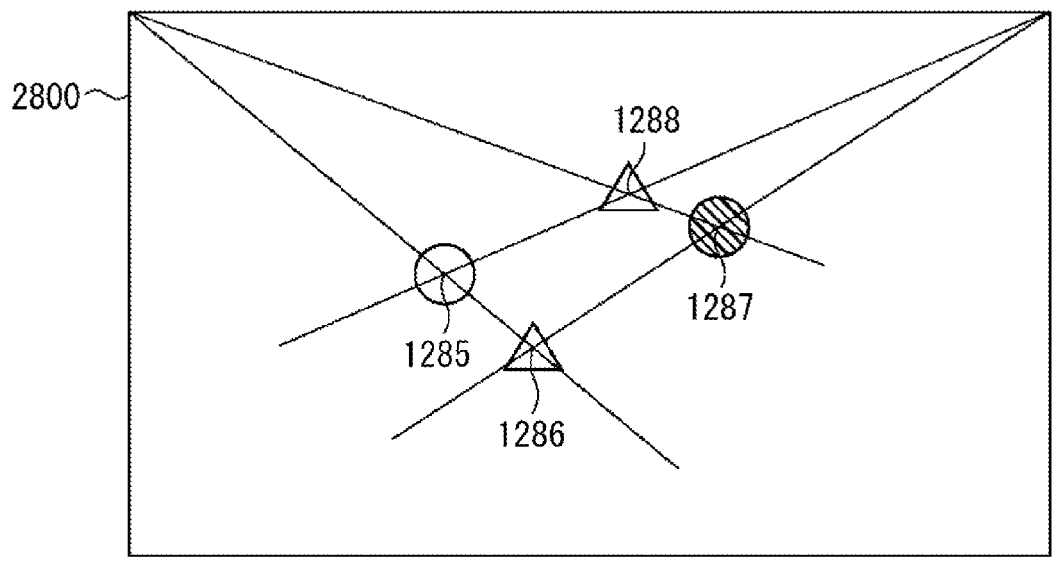
FIG. 12B illustrates a case where a true input coordinate position and an erroneous input coordinate position are arranged in a horizontal direction on a coordinate input region.

On the other hand, in a case where there is an input to the coordinate input region 4 using a pointing tool, output signals of the sensor units 1L and 1R represent light amount distributions similar to that illustrated in FIG. 11 of U.S. Patent Application Publication No. US 2006/0012579 A1.

According to the present embodiment, an angle of the pointing tool with respect to each of the sensor units 1L and 1R is calculated based on a change in the light amount distribution between the case where there is no input of a coordinate position pointed to using the pointing tool and the case where there is an input of a coordinate position pointed to using the pointing tool.

More specifically, data representing the light amount distributions respectively corresponding to the sensor units 1L and 1R in the case of no input of a coordinate position to the coordinate input region 4 using the pointing tool is preliminarily stored in the memory 82 as initial state data obtained at an initial stage. Then, it is detected whether the light amount distribution corresponding to each of the sensor units 1L and 1R changes in a sampling time period, in which detection signals of an associated one of the sensor units 1L and 1R are sampled, based on a difference in the light amount distribution between the initial time and the sampling time period. In a case where a change in the light amount distribution occurs, a portion at which the change in the light amount distribution occurs in the coordinate input region 4 is determined as an input point the position of which is input using the pointing tool. Then, an arithmetic operation for calculating an input angle of the input point with respect to each of the sensor units 1L and 1R is performed.

When an angle of the pointing tool with respect to each of the sensor units 1L and 1R is calculated, it is necessary to first detect a light-blocking range due to the pointing tool.

The light amount distribution detected by each of the sensor units 1L and 1R is not constant due to factors such as variation with time. Thus, it is desirable that the initial light amount distribution is stored in the memory 82, e.g., at each system start-up. Consequently, the latest initial light amount distribution of the coordinate input apparatus can be managed in the memory 82 except, for example in a case that the retroreflective surface of the retroreflective member 3 is stained with dust or the like and that thus the retroreflective surface cannot completely reflect light.

The calculation of an angle of the pointing tool using one of the sensor units 1L and 1R is described below. However, an angle of the pointing tool can be calculated similarly using the other sensor unit 1L or 1R.

At power on, in a state in which there is no input of a coordinate position and where the light projecting unit provided in the sensor unit 1L stops projecting light, a signal representing a light amount distribution output from the detection unit of the sensor unit 1L is subjected to an analog-to-digital (A/D) conversion. A value obtained by the A/D conversion is stored in the memory 82 as "Bas_data" [N].

This data includes variation of a bias of the detection unit (line CCD) and the like and has a level close to a level B illustrated in FIG. 10 of U.S. Patent Application Publication No. US 2006/0012579 A1. Here, "N" represents a pixel number of each pixel constituting the line CCD. In the following description, the pixel numbers of pixels corresponding to an effective input range (effective range) are used.

Next, in a state in which the light projecting unit projects light, a signal representing a light amount distribution output from the detection unit is subjected to an A/D conversion. A value obtained by the A/D conversion is stored in the memory 82 as "Ref_data" [N]. This value is indicated by a solid line illustrated in, e.g., FIG. 10 of U.S. Patent Application Publication No. US 2006/0012579 A1.

Then, it is determined, using the values Bas_data and Ref_data stored in the memory 82, whether there is an input of a coordinate position and whether there is a light-blocking range.

Now, suppose that pixel data of the N-th pixel in a sampling time period, in which outputs of the sensor unit 1L (line CCD) are sampled, is Norm_data [N].

First, in order to identify a light-blocking range, it is determined, according to an absolute amount of a change in pixel data, whether a light-blocking range is present. This process is performed to prevent occurrence of erroneous determination due to noise and to surely detect a predetermined amount of change.

More specifically, an absolute amount of a change in pixel data is calculated with respect to each pixel of the line CCD according to the following equation (1). Then, the calculated absolute amount is compared with a predetermined threshold value Vtha.

$$\text{Norm\_data\_}a\ [N] = \text{Norm\_data}\ [N] - \text{Ref\_data}\ [N] \qquad (1)$$

where "Norm_data_a [N]" is an absolute amount of change at each pixel of the line CCD.

In this process, the absolute amount Norm_data_a [N] at each pixel of the line CCD is calculated. Then, the calculated value is compared with the threshold value Vtha. Thus, it can be determined at high speed whether input of a coordinate position is present. More particularly, in a case where a predetermined number or more of pixels, the absolute amount corresponding to each of which first exceeds the threshold value Vtha, are detected, it is determined that input of a coordinate position using the pointing tool is present.

As described in U.S. Patent Application Publication No. US 2006/0012579 A1 with reference to FIGS. 12 through 15 thereof, input of a coordinate position using the pointing tool can be detected with higher precision by calculating a change ratio of pixel data to determine an input point.

In order to calculate actual coordinate values of the pointing tool from the pixel number of a central pixel in the light-blocking range obtained by the above-described processing, the pixel number of the central pixel is converted into angle information, as described in U.S. Patent Application Publication No. US 2006/0012579 A1 with reference to FIG. 16 thereof.

Next, as described in U.S. Patent Application Publication No. US 2006/0012579 A1 with reference to FIG. 17 thereof, the coordinate position of the pointing tool is calculated from angle data (tan θ), into which the pixel number is converted.

FIG. 3 is a flow chart of a coordinate input process for obtaining the coordinate position of the pointing tool, which is executed by the coordinate input apparatus according to the present embodiment. The CPU 83 controls operations to be performed according to the flow chart illustrated in FIG. 3.

First, when a power supply for the coordinate input apparatus is turned on, in step S102, the CPU 83 performs various initialization processing of the coordinate input apparatus, such as setting of a port and a timer in the control/arithmetic unit 2.

In step S103, the CPU 83 sets the number of times of performing initial reading operations of the line CCD in the detection units of the sensor units 1L and 1R.

The initial reading operation is performed to remove unnecessary electric charges from the line CCD at the start-up of the coordinate input apparatus.

In step S104, the CPU 83 performs operations of reading the line CCD. In step S105, the CPU 83 determines whether reading has been performed a predetermined number of times or more. If reading has not yet been performed the predetermined number of times or more (NO in step S105), the process returns to step S104. On the other hand, if reading has been performed the predetermined number of times or more (YES in step S105), the process proceeds to step S106.

In step S106, the CPU 83 fetches pixel data (Bas_data [N]) at pixels in the line CCD in a state, in which the light projecting unit stops projecting light, as first reference data. In step S107, the CPU 83 causes the memory 82 to store the first reference data.

Next, in step S108, the CPU 83 fetches pixel data (Ref_data [N]) at pixels in the line CCD in a state, in which the light projecting unit projects light, as second reference data. In step S109, the CPU 83 causes the memory 82 to store the second reference data.

The process performed until step S109 is an initial operation at power-on. The subsequent operation is an operation of inputting a coordinate position using the pointing tool.

In step S110, the CPU 83 performs a normal fetch operation of reading the line CCD in a coordinate input sampling state. Thus, the CPU 83 fetches pixel data (Norm_data [N]).

In step S111, the CPU 83 calculates a value of difference between the second reference data (Ref_data [N]) and pixel data (Norm_data [N]). In step S112, the CPU 83 determines, based on the difference value, whether input of a coordinate position using the pointing tool is present.

If there is no input (NO in step S112), the process returns to step S110. If a cycle period at that time is set at about 10 [msec], the number of sampling to be performed is 100 times/second. On the other hand, if there is an input (YES in step S112), the process proceeds to step S113. Hereinafter, an input coordinate position P (x, y), which is input using the pointing tool, is calculated by performing a process described in U.S. Patent Application Publication No. US 2006/0012579 A1.

That is, in step S113, the CPU 83 calculates a change ratio of pixel data according to equation (2) described in U.S. Patent Application Publication No. US 2006/0012579 A1.

In step S114, the CPU 83 determines a leading edge and a trailing edge using a threshold value set for the ratio calculated in step S113. Then, the CPU 83 determines the pixel number of a central pixel corresponding to the center of the light-blocking range using equations (4) to (6) described in U.S. Patent Application Publication No. US 2006/0012579 A1.

In step S115, the CPU 83 calculates a value of tan θ defined by equation (7) described in U.S. Patent Application Publication No. US 2006/0012579 A1 from the determined pixel number of the central pixel.

In step S116, the CPU 83 calculates the coordinate position P(x, y) input by the pointing tool from the value of tan θ with respect to each of the sensor units 1L and 1R using equations (8) and (9) described in U.S. Patent Application Publication No. US 2006/0012579 A1.

Next, in step S117, the CPU 83 selects, in a case where the number of input coordinate positions obtained in step S116 is 1, the single input coordinate position as an object to be output. In a case where the number of input coordinate positions obtained in step S116 is a plural number, the CPU 83 selects one of the input coordinate positions as an object to be output.

In a case where a plurality of light-blocking ranges are detected corresponding to each of the sensor units 1L and 1R, a plurality of input coordinate positions can be obtained by following the above-described process. Thus, according to the present embodiment, an input coordinate to be output is selected based on various predetermined conditions that will be described below. Such a selection process in step S117 will be described in detail below.

Next, in step S118, the CPU 83 determines whether an input using the pointing tool is a touch-down input. For example, in a case where a proximity input state, in which a cursor is moved without pressing a button of a mouse, and a touch-down state, in which the left button of the mouse is pressed, are set as states of inputting using the pointing tool, it is determined which of the proximity input state and the touch-down state is an input state using the pointing tool. Two types of input states are set such that, for example, in a case where the maximum value of the change ratio of pixel data, which is calculated in step S113, is equal to or more than a predetermined value (e.g., 0.5), the input state using the pointing tool is determined to be the touch-down input state and that in a case where the maximum value of the change ratio of pixel data is less than the predetermined value, the input state using the pointing tool is determined to be the proximity input state. Alternatively, in a case where a dedicated pointing tool is used, another method can be used, instead of pixel data, to determine the input state using the pointing tool. For example, whether the input state is the touch-down input state can be determined by providing a switch or the like at a tip end of the pointing tool and by transmitting and receiving data representing the state using an electromagnetic wave or light.

In a case where the input state using the pointing tool is determined according to such a determination method to be a touch-down input state (YES in step S118), the process proceeds to step S119, in which the CPU 83 sets a down flag indicating that the input state is a touch-down input state. On the other hand, in a case where the input state using the pointing tool is determined not to be a touch-down input state (NO in step S118), the process proceeds to step S120, in which the CPU 83 resets the down flag.

In step S121, the CPU 83 outputs information representing the state of the down flag and the calculated input coordinate values to an external terminal. Then, the external terminal performs, for example, movement of the cursor and change of the state of the button of the mouse based on the received information representing the input coordinate values and the state of the down flag.

Upon completion of finishing the processing in step S121, the process returns to step S110, in which subsequently, the CPU 83 repeats the above-described process until the power supply is turned off.

Next, the processing in step S117 is described below. As described above, in a case where the number of input coordinate positions to be detected is one, it is desirable to send the values of the single input coordinate position to an external terminal, similar to a conventional apparatus. However, in a case where an operator unintentionally causes the palm or a sleeve of operator's clothes to contact the surface of the coordinate input region 4 simultaneously with a pointing operation, the number of input coordinate positions to be detected becomes equal to or greater than two. Thus, in view of such a case, the present embodiment selects a coordinate position intentionally pointed to by the operator as an object to be output. In step S117, the coordinate position to which the operator unintentionally pointed with the palm or sleeve is eliminated from candidates to be output.

Hereinafter, an input due to an operator's intentional input pointing is referred to as a "true input". On the other hand, an operator's unintentional input by, e.g., a palm, or a sleeve of the operator's clothes is referred to as an "erroneous input". An operation of the coordinate input apparatus according to the present embodiment, which is performed in a case where one true input and one erroneous input are performed, is described below.

FIG. 4 illustrates an example of the coordinate input region 4 in a case where each of the sensor units 1L and 1R detects a plurality of light-blocking ranges.

As illustrated in FIG. 4, objects 2000 and 2001 are present in the coordinate input region 4 as light-blocking objects. Thus, the sensor unit 1L detects an area intervening between straight lines B11 and B12 and another area intervening between straight lines B13 and B14 as light-blocking ranges. Similarly, the sensor unit 1R detects an area intervening between straight lines A11 and A12 and another area intervening between straight lines A13 and A14 as light-blocking ranges.

Thus, when the sensor units 1L and 1R detect the light-blocking ranges, four coordinate positions A, B, P21, and P22 are obtained as input coordinate positions according to the above-described process.

Presuming that the object 2000 is a pointing tool and that the object 2001 is not a pointing tool (e.g., an elbow or an arm of an operator of the pointing tool, or a sleeve of the operator's clothes), the coordinate position A is a true input coordinate position. The coordinate positions B, P21, and P22 are erroneous input coordinate positions. The coordinate positions P21 and P22 are calculated as virtual images.

According to the present embodiment, in a case where four such coordinate positions are obtained, the coordinate input apparatus is controlled by the arithmetic control circuit 83 to select the coordinate position A. Such a control process is executed in step S117 illustrated in FIG. 3.

Now, an environment requiring such a selection process is described below.

Presuming a situation in which an operator points to a position on an image display surface (formed integrally with a display unit) using a pointing tool during a presentation, the operator points to a position on the image display surface so as not to cover the image display surface with the operator. At that time, typically, an elbow or arm of an operator of the pointing tool or a sleeve of the operator's clothes, moves close to the image display surface in addition to the pointing tool. When the sleeve, for example, touches the image display surface, a position at which the sleeve touches the image display surface is detected as an erroneous input coordinate position.

An operation of pointing to a position on the image display surface is typically performed by an operator facing the image display surface or an operator stretching an arm from the side of the image display surface. Accordingly, it is less likely that an operator performs a pointing operation by directing the pointing tool downwards.

In a case where an operator is right-handed, the operator stands to the right of the image display surface to perform a pointing operation. At that time, the operator's right arm extends horizontally in parallel with the image display surface. Thus, a sleeve of the operator's clothes is likely to touch the image display surface. However, in a case where the operator stands to the left of the image display surface, the operator bends the operator's elbow, thus the input of the position of the sleeve is unlikely.

This state is described below with reference to FIG. 5.

FIG. 5 illustrates a relationship between the location of an operator and a pointing operation with respect to an image display surface.

In a case where the operator is right-handed, the operator may stand at a position PA (to the right of the coordinate input region 4 serving as an image display surface) to operate the pointing tool. In such a case, an erroneous input of a coordinate position tends to occur. On the other hand, when the operator stands at a position PB (to the left of the coordinate input region 4 serving as an image display surface), an erroneous input is unlikely to occur.

Therefore, in consideration of the fact that an erroneous input is likely to occur in a case where an operator stands to the right of the image display surface, the following condition is set. That is, in a case where four coordinate positions 22a to 22d are obtained, a coordinate position (one or more coordinate positions) calculated from angle information A11 corresponding to the lowest angle (smallest angle) measured from the sensor unit 1R is a true input coordinate position. According to such a condition, coordinate positions 22a and 22d can be true input coordinate positions.

FIG. 6 illustrates surrounding regions of a coordinate position that is a true input coordinate position. In FIG. 6, a coordinate position 211 is a true input coordinate position. The periphery of the coordinate portion 211 can be divided into four areas 2190 through 2193 according to angle information corresponding to angles 2101 and 2102.

In a case where the coordinate position 211 is pointed to with a true input, the pointing tool is placed at the coordinate position 211. Under normal conditions, erroneous inputs cannot be performed in the areas 2190 and 2191. That is, erroneous inputs may be performed in any of the areas 2192 and 2193. Thus, among the four coordinate positions 22a through 22d illustrated in FIG. 5, the coordinate positions 22a and 22d are selected as candidates.

In addition, a true input coordinate position is selected from among coordinate positions 22a and 22d by calculating an absolute width from coordinate values and the light-blocking ranges.

In the above-described example, the coordinate positions 22a and 22d are inevitably obtained as a combination of a true input coordinate position and a virtual image coordinate position. One of coordinate positions 22a and 22d is selected as a true input coordinate position by computing an absolute width from the coordinate values and the light-blocking ranges using angle information obtained by the sensor unit 1R. The reason for using the angle information obtained by the sensor unit 1R is described below with reference to FIG. 4.

If angle information obtained by the sensor unit 1L is used, the absolute width of an area intervening between the straight lines B11 and B12, which is a light-blocking range corresponding to an erroneous input, or the absolute width of an area intervening between the straight lines B13 and B14, which is a light-blocking range corresponding to a true input, is calculated. In this case, according to the width of an area corresponding to an erroneous input light-blocking range, the absolute width of an area, which is a light-blocking range corresponding to an erroneous input, can be calculated to be close to that of an area, which is a light-blocking range corresponding to a true input. Thus, a true input coordinate position cannot be selected or determined.

On the other hand, in the case of the example illustrated in FIG. 4, the straight lines A11 and A12 are already selected. Thus, the absolute width can be calculated, without being affected by the light-blocking range corresponding to the erroneous input object 2001, by performing a selection process only on this light-blocking range. Then, the absolute width calculated from the light-blocking range corresponding to the two coordinate positions 22a and 22d is compared with a preliminarily set width of the light-blocking range due to an input by the pointing tool. Thus, a true input coordinate position can be selected. Consequently, the true input coordinate position can be selected without being affected by the erroneous input coordinate position.

In a case where an operator is left-handed, the apparatus similarly sets a condition in which a coordinate position (one or more coordinate positions) calculated from angle information B11 corresponding to the lowest angle (smallest angle) measured from the sensor unit 1L is a true input coordinate position. According to such a condition, coordinate positions 22c and 22d can be true input coordinate candidates. In addition, a true input coordinate position is selected from among these two coordinate positions by calculating an absolute width from coordinate values and the light-blocking ranges.

FIG. 7 is a flow chart of a true input coordinate position selection process executed in step S117.

First, in step S202, the CPU 83 determines whether the number of input coordinate positions obtained in step S116 is one or a plural number. If the number of input coordinate positions obtained in step S116 is one (NO in step S202), the process proceeds to step S207. This is a case where, for example, there is not an erroneous input due to a sleeve of the operator's clothes, etc. In step S207, the CPU 83 determines the single coordinate position as a true input coordinate position. In this case, in step S121, the single coordinate position (input coordinate value) is an object to be output.

On the other hand, if it is determined in step S202 that the number of input coordinate positions obtained in step S116 is a plural number (YES in step S202), the process proceeds to step S203.

In step S203, the CPU 83 reads dominant arm information preliminarily registered in the memory 82. Then, the CPU 83 determines whether the operator is right or left handed. This information is preliminarily registered in the memory 82. This information can also be registered corresponding to each operator in the memory 82. In this case, an operator can specify identification information corresponding to the operator in an initial stage of a process for using the coordinate input apparatus. A method for specifying identification information corresponding to the operator is not limited to a specific method.

In a case where it is determined that the operator is right-handed (YES in step S203), the process proceeds to step S204. In a case where it is determined that the operator is left-handed (NO in step S203), the process proceeds to step S205.

In step S204, the CPU 83 selects the sensor unit 1R from among a group of the sensor units 1L and 1R. Then, the CPU 83 selects two coordinate positions 22a and 22d based on the light amount distributions obtained using the sensor unit 1R, as illustrated in FIG. 5. More specifically, the CPU 83 selects the coordinate positions 22a and 22d calculated from angle information corresponding to the lowest angle (or the smallest angle) measured from the sensor unit 1R among various pieces of angle information corresponding to the light amount distributions obtained using the sensor unit 1R.

On the other hand, in step S205, the CPU 83 selects the sensor unit 1L among a group of the sensor units 1L and 1R. Then, the CPU 83 selects two coordinate positions 22c and 22d from among a plurality of coordinate positions obtained using the light amount distributions corresponding to the selected sensor unit 1L. More specifically, the CPU 83 selects the coordinate positions 22c and 22d calculated from angle information corresponding to the lowest angle (or the smallest angle) measured from the sensor unit 1L among various pieces of angle information corresponding to the light amount distributions obtained using the sensor unit 1L.

Next, in a case where the process proceeds from step S204 to step S206, the CPU 83 obtains, when an object is present at each of the coordinate positions 22a and 22d selected in step S204, the absolute width of each object in the light-blocking range detected using the sensor unit 1R selected in step S204. Next, in step S207, the CPU 83 compares the absolute width of each of the objects at the coordinate positions 22a and 22d obtained in step S206 with the preliminarily set width as the width of the pointing tool (data representing this width is preliminarily registered in the memory 82). Consequently, the CPU 83 selects one of the two coordinate positions selected in step S204 as a true input coordinate position. The one of the two coordinate positions, which is closer to the preliminarily set value, is determined as a true input coordinate position.

On the other hand, in a case where the process proceeds from step S205 to step S206, the CPU 83 obtains, when an object is present at each of the coordinate positions 22c and 22d selected in step S205, the absolute width of each object in the light-blocking range detected using the sensor unit 1L selected in step S205. Next, in step S207, the CPU 83 compares the absolute width of each of the objects at the coordinate positions 22c and 22d obtained in step S206 with the preliminarily set width as the width of the pointing tool (data representing this width is preliminarily registered in the memory 82). Consequently, the CPU 83 selects one of the two coordinate positions selected in step S205 as a true input coordinate position.

As is understood from the foregoing description, according to the present embodiment, among a plurality of coordinate positions, a coordinate position due to a true input can be selected according to an operator's dominant arm, i.e., according to whether the operator is right-handed or left-handed.

Second Exemplary Embodiment

In the following description of a second exemplary embodiment of the present invention, another example of the selection process performed in step S117 is described. In a case where a plurality of coordinate positions are obtained, in the selection process according to the present embodiment, the plurality of coordinate positions are divided into sets of two coordinate positions. Then, the distance between the two coordinate positions of each of the sets is calculated. Further, the distance calculated corresponding to each of the sets is compared with a preliminarily measured length of the operator's forearm. Thus, one of the sets is selected. Then, an upper one of the two coordinate positions of the selected set in the coordinate input region 4 is selected.

A coordinate position selection process according to the present embodiment is described below.

In a case where two coordinate positions including a true input coordinate position and an erroneous input coordinate position are input to the coordinate input region 4, four coordinate positions are obtained similar to the corresponding process described in the description of the first exemplary embodiment.

Figure 8:
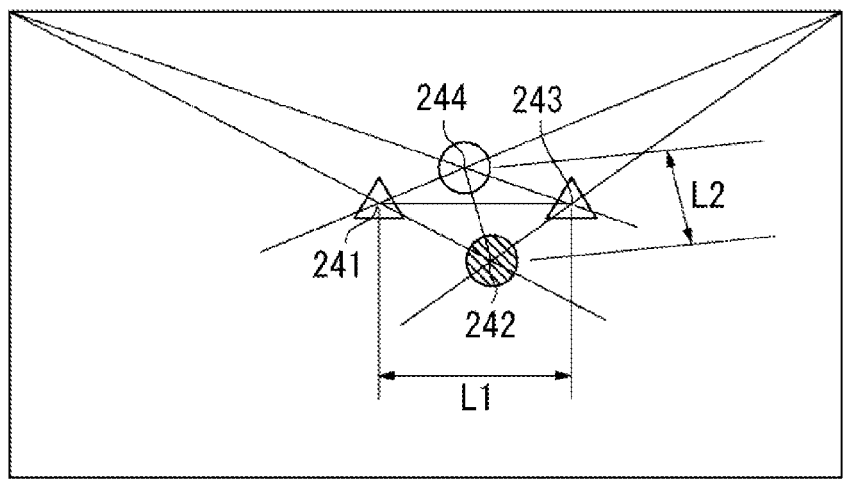
FIG. 8 illustrates an example of a coordinate input region in a case where coordinate positions of four points are obtained.

FIG. 8 illustrates an example of the coordinate input region 4 in a case where coordinate positions of four points are determined. As illustrated in FIG. 8, in a case where the coordinate positions 241 through 244 of the four points are obtained, a set of a true input coordinate position and an erroneous input coordinate position is any one of a set of the coordinate positions 242 and 244 and a set of the coordinate positions 241 and 243. A set of coordinate positions, which is not the set of a true input coordinate position and an erroneous input coordinate position, is a set of coordinate positions of virtual images. That is, any one of a set of a rightmost coordinate position and a leftmost coordinate position and a set of a highest coordinate position and a lowest coordinate position is a set of coordinate positions of virtual images.

As described in the first exemplary embodiment, an erroneous input occurs due to the fact that an arm holding the pointing tool is placed close to the coordinate input region 4. Thus, it is highly likely that an erroneous input coordinate position is present within a range of the distance between the hand and the elbow, in which the palm and a sleeve of the operator's clothes are present.

Accordingly, the distance between the two coordinate positions of each of the sets is calculated. A set of coordinate positions, the calculated distance between which is equal to or less than the distance DP between the hand and the elbow (i.e., the length of the forearm), is a set of a true input coordinate position and an erroneous input coordinate position. Then, an upper coordinate position between such a set of two coordinate positions is selected as a true input coordinate position.

That is, assuming that the two coordinate positions of a set are a true input coordinate position and an erroneous input that occurs between the hand and the elbow, the distance between the two coordinate positions is equal to or less than the distance DP. Accordingly, a set of two coordinate positions, the distance between which is longer than the distance DP, is a set of coordinate positions of virtual images. If L1>DP in FIG. 8, the set of a true input coordinate position and an erroneous input coordinate position is a set of the coordinate positions 242 and 244.

Next, an area, in which no erroneous input coordinate position can be present corresponding to a true input coordinate position, is now described. Assuming that the coordinate position 211 illustrated in FIG. 6 is a true input coordinate position, an erroneous input coordinate position is present in any one of the areas 2191 through 2193.

Then, an upper one of these two coordinate positions is selected as a true input coordinate position.

Next, a process executed in step S117 according to the present embodiment is described below with reference to FIG. 9.

In step S302, the CPU 83 determines whether the number of the input coordinate positions obtained in step S116 is one or a plural number. If the number of the input coordinate positions obtained in step S116 is one (NO in step S302), the process proceeds to step S310.

In step S310, the CPU 83 selects one of the input coordinate positions. Then, the process returns to step S118.

On the other hand, if it is determined as a result of determination in step S302 that the number of the input coordinate positions obtained in step S116 is a plural number (YES in step S302), the process proceeds to step S303.

In step S303, the CPU 83 divides the plurality of input coordinate positions into sets of two input coordinate positions. In addition, the CPU 83 calculates the distance between the two input coordinate positions of each set. In this example, it is assumed that the input coordinate positions of four points are detected. Thus, the number of the sets of two input coordinate positions is two. The two sets of two input coordinate positions are a set of a rightmost input coordinate position and a leftmost input coordinate position and a set of a highest input coordinate position and a lowest input coordinate position. According to the present embodiment, each of the distance L1 between the rightmost input coordinate position and the leftmost input coordinate position and the distance L2 between the highest input coordinate position and the lowest input coordinate position is compared with the distance D1.

The set of the input coordinate positions, the distance between which is less than or equal to the distance DP, is determined to be a set of a true input coordinate position and an erroneous input coordinate position. However, as described above, if one of the two sets of input coordinate positions is a set of coordinate positions of virtual images, the other set is a set of a true input coordinate position and an erroneous input coordinate position. Therefore, only the distance of one of the two sets, e.g., the distance L1, can be compared with the distance DP. If L1>DP, the set of the rightmost input coordinate position and the leftmost input coordinate position can be determined as a set of coordinate positions of virtual images. Thus, the set of the highest input coordinate position and the lowest input coordinate position can be determined as a set of a true input coordinate position and an erroneous input coordinate position. The process illustrated in the flow chart of FIG. 9 specifies a set of a true input coordinate position and an erroneous input coordinate position using only the distance between coordinate positions of one of the sets, instead of using the distances of coordinate positions of all sets.

In step S304, the CPU 83 reads data representing the length of the operator's forearm (the distance DP) preliminarily registered in the memory 82.

Next, in step S305, the CPU 83 determines whether L1>DP. If L1>DP (YES in step S305), the process proceeds to step S306. If L1≤DP (NO in step S305), the process proceeds to step S308.

In step S306, the CPU 83 selects the set of the highest input coordinate position and the lowest input coordinate position. Then, in step S307, the CPU 83 selects an upper input coordinate position from among the selected set as a true input coordinate position. Subsequently, the process returns to step S118.

On the other hand, in step S308, the CPU 83 selects the set of the leftmost input coordinate position and the rightmost input coordinate position. Then, in step S309, the CPU 83 selects the left-side coordinate position 241 as a true input coordinate position if the operator is right-handed, while the CPU 83 selects the right-side coordinate position 243 as a true input coordinate position if the operator is left-handed. In a case where there is a difference in height between the leftmost input coordinate position and the rightmost input coordinate position, a higher input coordinate position can be selected as a true input coordinate position. Then, the process returns to step S118.

Third Exemplary Embodiment

In the following description of a third exemplary embodiment of the present invention, still another example of the selection process performed in step S117 is described. In a selection process according to the present embodiment, the location of an operator of the pointing tool is acquired. Then, in a case where a plurality of coordinate positions are obtained, one of the plurality of coordinate positions is selected based on a light amount distribution obtained by a sensor unit that is determined according to the location of the operator.

FIG. 10 illustrates a positional relationship between the coordinate input region 4 and an operator PA. Devices 281 through 283 illustrated in FIG. 10 are used to measure the location of the operator PA. Each of the devices 281 through 283 is constituted by a pyroelectric sensor, an ultrasonic sensor, an infrared sensor, etc. The coordinate input apparatus according to the present embodiment determines, utilizing detection of infrared rays or reflection of acoustic waves, whether a person is present in a detection area.

In an example illustrated in FIG. 10, the operator PA is located in the detection area K of the device 283. Thus, the location of the operator PA is measured by the device 283. Data representing the location of the operator PA detected by the devices 281 through 283 is input to the coordinate input apparatus. The input data is stored in the memory 82. The "location" to be detected corresponds to an x-coordinate value in the coordinate input region 4. In a case where the operator PA is located at the rightmost end of the coordinate input region 4, the rightmost coordinate value of the coordinate input region 4 is measured by the device 283.

The CPU 83 of the coordinate input apparatus obtains a positional relationship between the location of the operator PA, which is detected by one of the devices 281 through 283, and a coordinate position thereof detected by the sensor units 1L and 1R in the coordinate input region 4 (the relationship between the x-coordinate values of the detected positions). Then, the CPU 83 determines, based on the obtained positional relationship, from which of leftward and rightward directions the operator PA points to a position on the coordinate input region 4. In an example illustrated in FIG. 10, the CPU 83 determines that the operator PA points to each coordinate position detected by the sensor units 1L and 1R from the rightward direction of the coordinate input region 4.

Therefore, in this case, the CPU 83 selects a true input coordinate position according to the light amount distribution obtained using the sensor unit 1R in a manner similar to the manner used in the first exemplary embodiment. In a case where the CPU 83 determines that the operator PA points to each of the coordinate positions detected using the sensor units 1L and 1R from the leftward side of the coordinate input region 4, the CPU 83 selects a true input coordinate position based on the light amount distribution obtained using the sensor unit 1L, similar to that of the first exemplary embodiment.

Next, a process executed in step S117 according to the present embodiment is described below with reference to FIG. 11.

First, in step S402, the CPU 83 determines whether the number of the input coordinate positions obtained in step S116 is one or a plural number. If the number of the input coordinate positions obtained in step S116 is one (NO in step S402), the process proceeds to step S411. In step S411, the CPU 83 determines the single coordinate position as a true input coordinate position. In this case, the CPU 83 sets the signal coordinate position (input coordinate position) as an object to be output.

On the other hand, if it is determined as a result of the determination in step S403 that the number of the input coordinate positions obtained in step S116 is a plural number (YES in step S402), the process proceeds to step S403.

In step S403, the CPU 83 waits for a result of the detection of the location of the operator PA using the devices 281 through 283. If the location of the operator PA is detected, a result of the detection, which indicates where the operator is located on an x-axis in the coordinate input region 4, is stored in the memory 82.

In step S404, the CPU 83 obtains a positional relationship indicating a pattern 1, in which the location f acquired in step S403 is located more rightward than the rightmost coordinate position g (f>g), or a pattern 2 in which the location f acquired in step S403 is located more leftward than the leftmost coordinate position h (f<h).

In step S405, the CPU 83 determines whether the obtained positional relationship indicates the pattern 1. If the obtained positional relationship indicates the pattern 1 (YES in step S405), the process proceeds to step S406. If the obtained positional relationship does not indicate the pattern 1 (NO in step S405), the process proceeds to step S407. In step S406, the CPU 83 selects the sensor unit 1R. In addition, the CPU 83 selects the two coordinate positions 284 and 287 based on the light amount distributions obtained using the sensor unit 1R, as illustrated in FIG. 10.

In step S407, the CPU 83 determines whether the obtained positional relationship indicates the pattern 2. If the obtained positional relationship indicates the pattern 2 (YES in step S407), the process proceeds to step S408. If the obtained positional relationship does not indicate the pattern 1 (NO in step S407), the process proceeds to step S409. In step S408, the CPU 83 selects the sensor unit 1L. In addition, the CPU 83 selects the two coordinate positions 286 and 287 based on the light amount distributions obtained using the sensor unit 1L, as illustrated in FIG. 10.

In step S409, the CPU 83 executes error processing. For example, the CPU 83 inhibits an output of the coordinate position. The error processing according to the present embodiment is not limited to specific processing.

In step S410, the CPU 83 calculates, in a case where objects are present at two coordinate positions selected in step S406 or S407, the width of each of the objects. In step S411, the CPU 83 determines the coordinate position corresponding to one of the two widths calculated in step S410, which is closer to the width of the pointing tool, as a true input coordinate position.

Steps S406, S408, S410, and S411 correspond to steps S204, S205, S206, and S207, respectively. The relationship among steps S406, S408, S410, and S411 is similar to that among steps S204, S205, S206, and S207.

Thus, the present embodiment utilizes information representing the positional relationship between the location of the operator and the coordinate input region, instead of information regarding whether the operator is right-handed or left-handed. Further, according to the present embodiment, it is determined, based on the positional relationship therebetween, from which of leftward and rightward directions the operator points to a position on the coordinate input region. Consequently, the present embodiment can select a true input coordinate position based on the light amount distributions obtained using one of the sensor units, similar to the first exemplary embodiment.

The above-described exemplary embodiments can be used by being appropriately combined with one another.

Thus, any of the above-described exemplary embodiments can prevent output of coordinate values obtained by an operator's unintentional erroneous input due to the operator's clothes, etc.

Other Exemplary Embodiment

The present invention can be embodied as, for example, a system, an apparatus, a method, a program, or a storage medium. More particularly, the present invention can be applied to a system including a plurality of devices, and to an apparatus constituted by a single device.

The present invention can be achieved by an exemplary embodiment implemented by supplying a software program (program corresponding to each of the above-described flowcharts), which implements the functions of the above-described exemplary embodiments, directly or remotely to a system or an apparatus, and reading and executing the supplied program code by a computer of the system or the apparatus.

Accordingly, the present invention can be implemented by program code installed on a computer to implement the functions according to at least one exemplary embodiment of the present invention by a computer. That is, the present invention includes a computer program itself used to implement the functions according to at least one exemplary embodiment of the present invention.

In this case, as long as the computer program has functions of a program, the computer program can have any form, such as object code, a program executed by an interpreter, or script data supplied to an operating system (OS).

Examples of storage media used to supply the program are a floppy disk, a hard disk, an optical disk, a magneto-optical disc, a magnetic disc, a compact disc read-only memory (CD-ROM), a compact disc recordable (CD-R), a compact disc rewritable (CD-RW), a magnetic tape, a non-volatile memory card, a read-only memory (ROM), and a digital versatile disc (DVD) (a digital versatile disc read-only memory (DVD-ROM) and a digital versatile disc-recordable (DVD-R)).

In addition, the following method is used to supply the program. That is, a client computer is connected to a web page on the Internet using a browser of the client computer. Then, a computer program itself according to at least one exemplary embodiment or a compressed file of the program having an automatic installing function is downloaded from the web page to a recording medium, such as a hard disk. Alternatively, the program according to at least one exemplary embodiment is supplied by dividing the program code, which constitutes the program, into a plurality of files and by then downloading the files from different web pages. That is, the present invention includes a World Wide Web (WWW) server adapted to download, to a plurality of users, the program files implementing the functions according to at least one exemplary embodiment by a computer.

Further, the functions according to at least one exemplary embodiment can be implemented by encrypting the program according to at least one exemplary embodiment, then storing the encrypted program on a storage medium, such as a CD-ROM, subsequently distributing the storage medium to users, then causing users, who meet predetermined conditions, to download decryption key information from a web site via the Internet, and subsequently causing the users to decrypt the encrypted program by using the key information, to install the program on a computer.

Alternatively, the functions according to the above-described exemplary embodiments can be implemented by executing a program read by the computer. Alternatively, an OS running on the computer can perform all or part of actual processing, so that the functions of the above-described exemplary embodiments can be implemented by this processing.

Furthermore, after the program read from the storage medium is written to a memory provided in a function expansion board inserted into the computer or to a memory provided in a function expansion unit connected to the computer, a CPU mounted on the function expansion board or the function expansion unit performs all or part of the actual processing, so that the functions of the above-described exemplary embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-211057 filed Aug. 13, 2007, which is hereby incorporated by reference herein in its entirety.

What is claimed is:

1. A coordinate input apparatus to select a coordinate position in a coordinate input region due to a true input according to an operator's dominant arm, the coordinate input apparatus comprising:

a plurality of detection units including a first sensor unit and a second sensor unit, wherein the first sensor unit is positioned to a right of a person who faces the coordinate input region and the second sensor unit is positioned to a left of a person who faces the coordinate input region;

a memory in which dominant arm information, specifying whether the operator is right-handed or left-handed, is registered for the operator prior to the coordinate input region receiving input from the operator;

an obtaining unit configured to obtain a plurality of coordinate positions, wherein the obtained coordinate positions are those coordinate positions detected by each sensor unit of the plurality of detection units, wherein the obtained plurality of coordinate positions includes a true input coordinate position input from the operator and at least one erroneous input coordinate position input from the operator, and wherein virtual coordinate positions for the true input coordinate position and the at least one erroneous input coordinate position are obtained;

a reading unit configured to read the memory to obtain dominant arm information specifying weather the operator is specified as right-handed or specified as left-handed;

a selection unit configured to select, as coordinate position data, coordinate positions obtained by the obtaining unit, wherein, in response to the memory specifying that the operator is right-handed, the selection unit selects, as the coordinate position data, coordinate positions obtained from inputs detected by the first sensor unit such that the coordinate position data includes the true input coordinate position and does not include the at least one erroneous input coordinate position, and wherein, in response to the memory specifying that the operator is left-handed, the selection unit selects, as the coordinate position data, coordinate positions obtained from inputs detected by the second sensor unit such that the coordinate position data includes the true input coordinate position and does not include the at least one erroneous input coordinate position;

a determining unit configured to determine the true input coordinate position from the coordinate position data selected by the selection unit; and an output unit configured to output data indicating the determined true input coordinate position as an input coordinate position input from the operator.

2. The coordinate input apparatus according to claim 1, further comprising a retroreflective unit located on peripheral portions of the coordinate input region and configured to recursively reflect incident light, wherein the first sensor unit and the second sensor unit are part of a plurality of sensor units that projects light to the coordinate input region and receives light reflected by the retroreflective unit, and wherein the obtaining unit calculates a pointing tool input coordinate position in the coordinate input region based on light amount distribution obtained using the plurality of sensor units.

3. The coordinate input apparatus according to claim 1, wherein the obtaining unit further is configured to determine whether there is an input into the coordinate input region and, in response to determining that there is an input into the coordinate input region, the determining unit determines whether the obtaining unit obtained one coordinate position or a plurality of coordinate positions.

4. The coordinate input apparatus according to claim 3, in response to the determining unit determining that one coordinate position is obtained, the output unit outputs the one coordinate position as the true input coordinate position without the reading unit reading the memory to obtain information specifying weather the pointing tool operator is specified as right-handed or specified as left-handed.

5. The coordinate input apparatus according to claim 1, wherein a number of the first sensor coordinate positions obtained from inputs detected by the first sensor unit are numerically less than a number of the obtained plurality of coordinate positions.

6. The coordinate input apparatus according to claim 1, wherein the plurality of coordinate positions obtained by the obtaining unit are stored in the memory.

7. The coordinate input apparatus according to claim 1, wherein the at least one erroneous input coordinate position is received simultaneously with the true input coordinate position and the at least one erroneous input coordinate position from other than the tip of the pointing tool is received from a part of a body other than a pointing tool.

8. The coordinate input apparatus according to claim 7, wherein the at least one erroneous input coordinate position from other than the tip of the pointing tool is received from a sleeve, palm, or elbow of the pointing tool operator or a finger of the pointing tool operator other than a finger being used by the pointing tool operator as the pointing tool.

9. The coordinate input apparatus according to claim 1, wherein the true input coordinate position and a first virtual image coordinate position form a first combination associated with only one of the first sensor unit and the second sensor unit and the erroneous input coordinate position and a second virtual image coordinate position form a second combination associated with only one of the other of the first sensor unit and the second sensor unit.

10. A method for a coordinate input apparatus to select a coordinate position in a coordinate input region due to a true input according to an operator's dominant arm, wherein the coordinate input apparatus includes a plurality of detection units including a first sensor unit and a second sensor unit, wherein the first sensor unit is positioned to a right of a person who faces the coordinate input region and the second sensor unit is positioned to a left of a person who faces the coordinate input region, the method comprising:

registering dominant arm information, specifying whether the operator is right-handed or left-handed, for the operator in a memory prior to the coordinate input region receiving input from the operator;

obtaining a plurality of coordinate positions, wherein the obtained coordinate positions are those coordinate positions detected by each sensor unit of the plurality of detection units, wherein the obtained plurality of coordinate positions includes a true input coordinate position input from the operator and at least one erroneous input coordinate position input from the operator, and wherein virtual coordinate positions for the true input coordinate position and the at least one erroneous input coordinate position are obtained;

reading the memory to obtain dominant arm information specifying weather the operator is specified as right-handed or specified as left-handed;

selecting, as coordinate position data, obtained coordinate positions, wherein, in response to the memory specifying that the operator is right-handed, selecting includes selecting, as the coordinate position data, coordinate positions obtained from inputs detected by the first sensor unit such that the coordinate position data includes the true input coordinate position and does not include the at least one erroneous input coordinate position, and wherein, in response to the memory specifying that the operator is left-handed, selecting includes selecting, as the coordinate position data, coordinate positions obtained from inputs detected by the second sensor unit such that the coordinate position data includes the true input coordinate position and does not include the at least one erroneous input coordinate position;

determining the true input coordinate position from the selected coordinate position data; and outputting data indicating the determined true input coordinate position as an input coordinate position input from the operator.

* * * * *